July 2, 1940.                G. G. LANDIS ET AL                2,206,037
                              ARC WELDING APPARATUS
                              Filed Dec. 22, 1937                2 Sheets-Sheet 1

INVENTORS
George G. Landis and
Leonidas K. Stringham.
BY Fay, Oberlin & Fay
ATTORNEYS

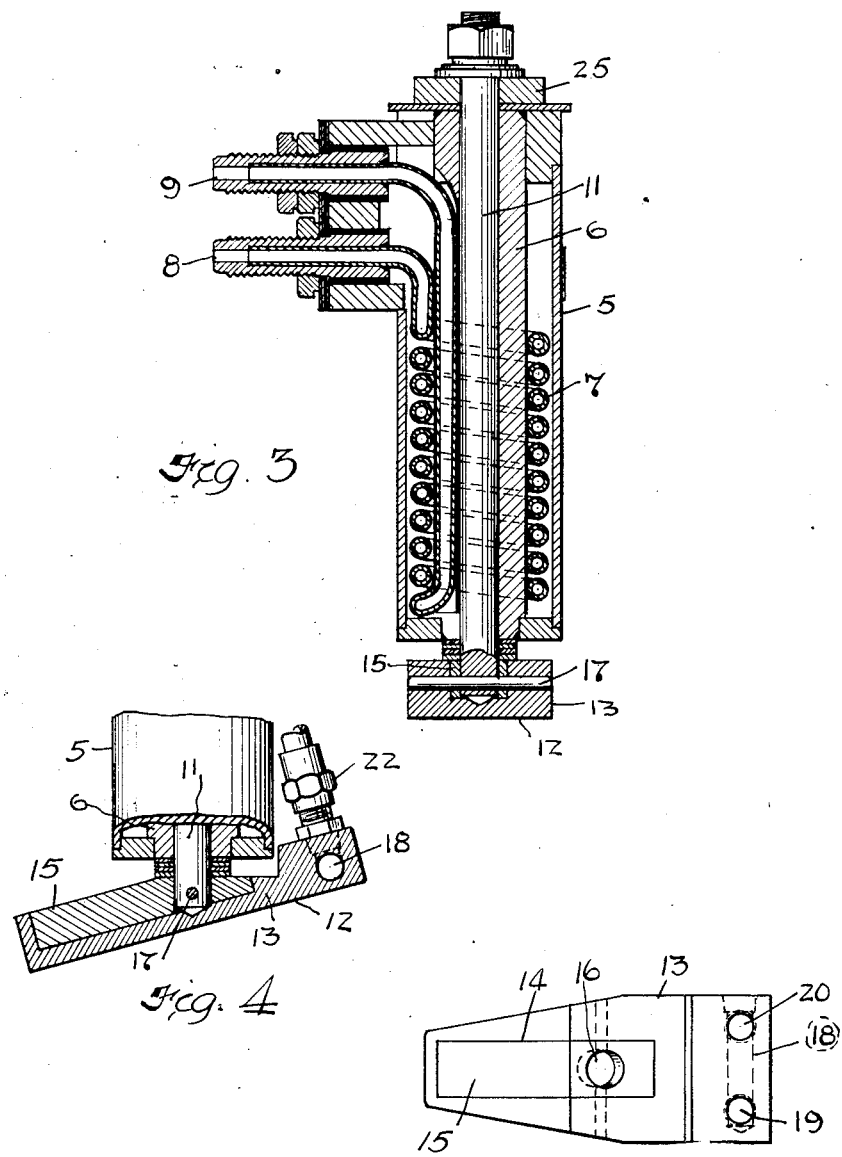

Patented July 2, 1940

2,206,037

UNITED STATES PATENT OFFICE 2,206,037

ARC WELDING APPARATUS

George G. Landis and Leonidas K. Stringham, University Heights, Ohio, assignors to The Lincoln Electric Company, Cleveland, Ohio, a corporation of Ohio Application December 22, 1937, Serial No. 181,181

3 Claims. (Cl. 219—8)

This invention relates, as indicated, to electric arc welding apparatus and is primarily concerned with the controlling and directing of the arc maintained between the work and the electrode presented in arcing relation thereto.

It is well-recognized that when welding with an electric arc, many factors such as unbalanced magnetic conditions in the vicinity of the arc tend to cause the same to behave in an erratic manner so that it does not follow the desired line of travel along the work.

It is the principal object of our invention, therefore, to provide a method of and apparatus for arc welding characterized by an improved control over the welding arc.

Other objects of our invention will appear as the description proceeds.

To the accomplishment of the foregoing and related ends, said invention, then, consists of the means hereinafter fully described and particularly pointed out in the claims; the annexed drawings and the following description setting forth in detail certain means and one mode illustating, however, but one of the various ways in which the principle of the invention may be used.

Figure 1:
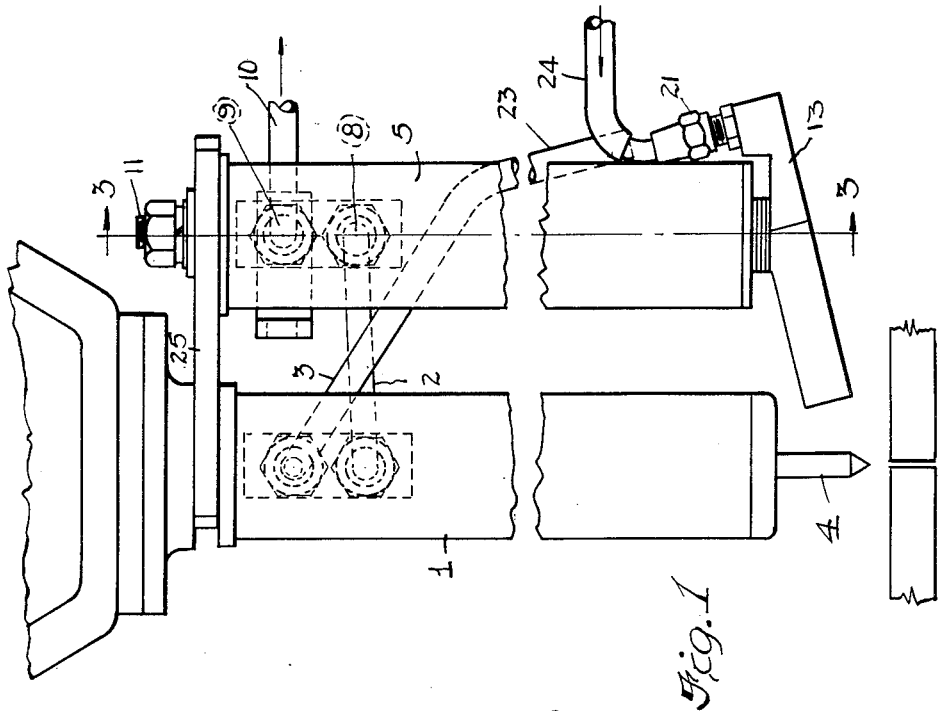
Figure 2:
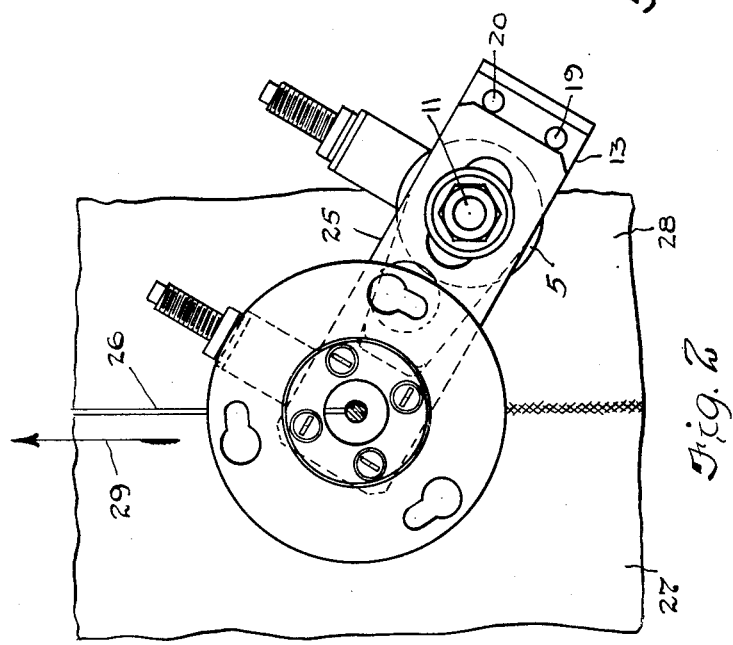

In said annexed drawings:

Fig. 1 is a broken side elevational view of one form of apparatus constructed in accordance with the principles of our invention; Fig. 2 is a plan view of the apparatus illustrated in Fig. 1; Fig. 3 is a vertical sectional view of a portion of the apparatus illustrated in Fig. 1 taken on a plane substantially indicated by the line 3—3; Fig. 4 is a part sectional, part side elevational view of a portion of the apparatus illustrated in Figs 1 and 3; and Fig. 5 is a plan view of one of the elements of the combination illustrated in Fig. 4.

Referring now more specifically to the drawings and more especially to Fig. 1, the apparatus here illustrated comprises an electrode-supporting means generally indicated at 1; the form of construction and mode of operation is illustrated and described in Patent No. 1,840,601, issued to C. C. Peck, on January 12, 1932.

The electrode holder 1, it will be observed, includes a helically arranged coil on the interior thereof from which leads 2 and 3 extend as shown in Fig. 1. This helical coil of tubing is employed for the purpose of conducting the welding current to the electrode 4; to cool the electrode holder 1 and by virtue of its helical arrangement coaxially with the electrode, to establish a controlling magnetic field substantially concentric therewith.

In particular, our invention comprises the addition of a second electromagnet 5 arranged substantially parallel and adjacent to the electromagnetic electrode holder 1.

The electromagnet 5 consists of an inner core 6 about which is arranged a helically wound tube 7; the leads 8 and 9 of which extend laterally therefrom so that the lead 8 may be connected as illustrated in Fig. 1 with the lead 2 of the electrode holder 1 and the lead 9 connected to a tube 10 to which a suitable cooling water outfall conduit (not shown) may be connected.

Extending centrally through the core 6 is a bolt 11 to the lower end of which is secured a magnetic shoe, generally indicated at 12. This shoe 12 includes a member 13, the form of which is most clearly illustrated in Fig. 5. The member 13 is preferably formed of some efficient heat conducting material such as copper, and is centrally provided with an elongated recess 14 in which is mounted a bar 15 of magnetic material.

It will be observed that the lower end of the bolt 11 extends into an opening 16 in the bar 15 and the entire assembly then secured together by means of a pin 17 passing through the member 13, the bar 14 and the lower end of the bolt 11.

A transversely extending passage 18 is provided in the heel of the member 13 from which passages 19 and 20 extend. The passages 19 and 20 are provided with connecting nipples 21 and 22 respectively. A conduit 23 connects the nipple 22 with the lead 3 and the nipple 21 is provided with an extension 24 to which may be connected a conduit for the supply of cooling water.

It will be observed that one or both of the conduits connected to the extensions 8 and 9 will be of electrical conductive material so that the welding current for the electrode 4 may be led in series or parallel, as may be desired, through the two electromagnets 1 and 5 respectively, to the welding electrode 4.

The electromagnet 5 is supported from the electrode holder 1 by means of a bridge member 25 of magnetic material.

The function and mode of operation of the above described apparatus is briefly as follows:

In Fig. 2, the welding apparatus previously described is shown positioned in arcing relation to the seam 26 between work pieces 27 and 28. The direction of movement of the welding apparatus with respect to the work is indicated by the arrow 29.

As the electrode 4 and the work are moved relatively in the manner above explained, with the welding arc maintained between the electrode and the work, the electromagnet in the holder 1 and the electromagnet 5 will establish magnetic fields which have a controlling and directing influence on the arc. The provision of a separate electromagnet in addition to the electromagnet contained in the holder 1, coupled with the fact that these two electromagnets are magnetically coupled by the bridge member 25 and the further fact that the two electromagnets are preferably, although not necessarily, of opposed polarity makes possible the establishment of a directing and controlling magnetic influence over the welding arc not possible by any previously available type of apparatus.

It will be observed that by having the bridge member 25 supported in such a manner that it may be rotated about the axis of the electrode holder 1, the auxiliary electromagnet 5 may be moved to occupy any position on a circle around the axis of the electrode 4. In this way, any desired directional influence may be exerted on the welding arc by the combined magnetic effect by the fields produced by the two electromagnets.

Other modes of applying the principle of our invention may be employed instead of the one explained, change being made as regards the means and the steps herein disclosed, provided those stated by any of the following claims or their equivalent be employed.

We, therefore, particularly point out and distinctly claim as our invention:

1. In electric arc welding apparatus, the combination with a welding electrode adapted to be presented in arcing relation to the work, of a plurality of laterally adjacent electromagnets, one of which is arranged coaxially with said welding electrode, a magnetic bridge coupling the adjacent ends of said electromagnets remote from the operating end of said electrode, said bridge being rotatably adjustable about the axis of said electrode to permit corresponding adjustment of the other of said electromagnets about the one thus coaxially arranged, and a projection of magnetic material extending from the pole of such adjustable electromagnet radially toward the operating end of said electrode.

2. In electric arc welding apparatus, the combination with a welding electrode adapted to be presented in arcing relation to the work, of a plurality of laterally adjacent electromagnets one of which is arranged coaxially with said welding electrode, a magnetic bridge coupling the adjacent ends of said electromagnets remote from the operating end of said electrode, a projection of magnetic material extending from the pole of one of said electromagnets toward the operating end of said electrode, and a shoe of copper surrounding said projection.

3. In electric arc welding apparatus, the combination with a welding electrode adapted to be presented in arcing relation to the work, an electromagnet arranged coaxially with said welding electrode, a second electromagnet arranged adjacent said first electromagnet, and a projection of magnetic material extending from one of the poles of said second electromagnet toward the operating end of said electrode.

GEORGE G. LANDIS.
LEONIDAS K. STRINGHAM.